United States Patent

Burkett et al.

[11] Patent Number: 5,223,544
[45] Date of Patent: Jun. 29, 1993

[54] PROCESS FOR THE REMOVAL OF FOREIGN MATERIALS FROM A POST-CONSUMER PLYETHYLENE TEREPHTHALATE FEED STREAM

[75] Inventors: Eugene J. Burkett, Scott Depot, W. Va.; Randy S. Jenks, Bidwell, Ohio

[73] Assignee: Shell Oil Company, Houston, Tex.

[21] Appl. No.: 860,963

[22] Filed: Mar. 31, 1992

[51] Int. Cl.⁵ .............................................. C08J 11/06
[52] U.S. Cl. ...................................... 521/48; 521/41; 521/48.5
[58] Field of Search .......................... 521/48, 48.5, 41

[56] References Cited

U.S. PATENT DOCUMENTS

| | | | |
|---|---|---|---|
| 3,108,082 | 10/1963 | Riehe et al. | 521/48 |
| 3,652,466 | 3/1972 | Hittel et al. | 521/48 |
| 3,884,850 | 5/1975 | Ostrowski | 521/48.5 |
| 4,143,001 | 3/1979 | Raab et al. | 521/48 |
| 4,439,550 | 3/1989 | Brennan | 521/48.5 |
| 4,542,239 | 9/1985 | Lamparter et al. | 562/485 |
| 4,605,762 | 8/1986 | Mandori | 562/485 |
| 4,609,680 | 9/1986 | Fujita et al. | 521/48 |
| 5,045,145 | 3/1992 | Rosen | 562/483 |
| 5,120,768 | 6/1992 | Sisson | 521/48 |

FOREIGN PATENT DOCUMENTS

| | | | |
|---|---|---|---|
| 0019876 | 6/1973 | Japan | 521/48 |
| 9010667 | 9/1990 | PCT Int'l Appl. | 521/48 |

Primary Examiner—Paul R. Michl
Assistant Examiner—Olga Asinovsky

[57] ABSTRACT

In today's environment, it is becoming increasingly more important to recycle plastics including polyethylene terephthalate. Technology available today allows for polyethylene terephthalate to be recycled into a wide variety of useful products. For instance, carbonated beverage bottles which are comprised of polyethylene terephthalate can be recycled into new polyethylene terephthalate beverage bottles. However, a relatively pure polyethylene terephthalate post consumer feed stream is required in many such recycling programs. Unfortunately, such feed streams are often contaminated with foreign material. This invention relates to a process for removing foreign materials from a post-consumer polyethylene terephthalate feed stream which comprises: (1) depolymerizing the polyethylene terephthalate feed stream into a melt having a melt viscosity which is within the range of 0.001 poise to 1000 poise, (2) feeding the melt into a separation device, (3) allowing low density foreign materials to float to the surface of the melt, (4) allowing high density foreign materials to sink to the bottom of the melt, and (5) removing molten polyethylene terephthalate oligomer from an area which is located intermediately between the surface of the melt and the bottom of the melt.

8 Claims, 1 Drawing Sheet

PROCESS FOR THE REMOVAL OF FOREIGN MATERIALS FROM A POST-CONSUMER PLYETHYLENE TEREPHTHALATE FEED STREAM

BACKGROUND OF THE INVENTION

In 1989 approximately 700 million pounds of polyethylene terephthalate (PET) were consumed to produce soft drink bottles. Presently about 28% of this material is recycled with the remainder being placed in landfills or incinerated. Due to problems with overloaded landfills and the negative environmental image plastics has received recently, bills have been introduced aimed at establishing bottle deposits and the number of curbside recycling programs has increased tremendously. The collection of PET bottles and food trays through these programs has resulted in a source of post consumer PET which has been used for a number of applications. Generally these applications involve the conversion and fabrication of the post-consumer PET into materials of lower value. Examples of such applications are polyols for unsaturated polyesters or polyurethanes, fiberfill, carpet fibers, and strapping. Recycled PET is also blended with other materials such as polybutylene terephthalate, polycarbonate, or glass fibers, etc., for automotive as well as other engineering applications.

Post-consumer PET can also be recycled into resin which can be used in manufacturing containers for foods and beverages, such as carbonated beverage bottles. In such procedures, the post-consumer PET is generally depolymerized to oligomers or its monomers which are subsequently utilized as a raw material in the preparation of the recycled PET resin. Such a procedure for depolymerizing PET is described in U.S. Pat. No. 3,703,488 and U.S. Pat. No. 3,884,850.

In such recycling programs, it is important to separate the post-consumer PET from other plastics in the recycle stream. Foreign materials can be removed from such post-consumer PET feed stream by hand separation. Foreign materials, such as other plastics, can also be removed from the post-consumer PET feed stream by flotation procedures which are based upon density and/or wettability differences between the plastics. Nevertheless, such procedures generally do not result in the total removal of foreign materials from the post consumer PET feed stream. This is particularly true of glues, small particle size foreign materials, and polymeric melt blends. For instance, some post-consumer PET sources are melt blends of the PET with one or more other plastics. In the case of such melt blends, the other plastics cannot be removed from the PET by physical separation procedures. For instance, dual ovenable trays which are used extensively by the frozen prepared food industry typically contain about 97% PET and about 3% linear low density polyethylene. It is, of course, not possible to separate the polyethylene from the PET in such melt blends by mechanical means. Nevertheless, there is a tremendous need to remove polyethylene and other foreign materials which are intimately mixed with the PET from such feed streams.

SUMMARY OF THE INVENTION

By utilizing the techniques of this invention, foreign materials which are in PET feed streams can be removed. This technique is particularly useful in the removal of polyethylene and other polymeric material which have been melt blended with the PET in the post-consumer feed stream. By utilizing this procedure, metals, such as residual catalysts, can be removed from PET feed streams. This technique involves depolymerizing the PET in the feed stream and subsequently separating the foreign materials therein from the PET melt.

The subject invention more specifically discloses a process for removing foreign materials from a polyethylene terephthalate feed stream which comprises: (1) depolymerizing the polyethylene terephthalate feed stream into a liquid having a viscosity which is within the range of 0.001 poise to 1000 poise, (2) feeding the liquid into a separation device, (3) allowing low density foreign materials to migrate to the surface of the liquid, (4) allowing high density foreign materials to migrate to the bottom of the liquid, and (5) removing depolymerized polyethylene terephthalate from an area which is located intermediately between the surface of the liquid and the bottom of the liquid.

The present invention also reveals a process for removing foreign materials from a polyethylene terephthalate feed stream which comprises: (1) depolymerizing the polyethylene terephthalate feed stream into a liquid having a viscosity which is within the range of 0.001 poise to 1000 poise, (2) feeding the liquid into a separation device, (3) allowing low density foreign materials to migrate to the surface of the liquid, and (4) removing depolymerized polyethylene terephthalate from below the surface of the liquid.

The subject invention further discloses a process for removing foreign materials from a polyethylene terephthalate feed stream which comprises: (1) dissolving the polyethylene terephthalate feed stream in a sufficient amount of a solvent to produce a liquid system having a viscosity which is within the range of 0.001 poise to 1,000 poise, (2) feeding the liquid system into a separation device, (3) allowing low density foreign materials to migrate to the surface of the liquid system, and (4) removing dissolved purified polyethylene terephthalate from below the surface of the liquid system.

DETAILED DESCRIPTION OF THE INVENTION

Figure 1:
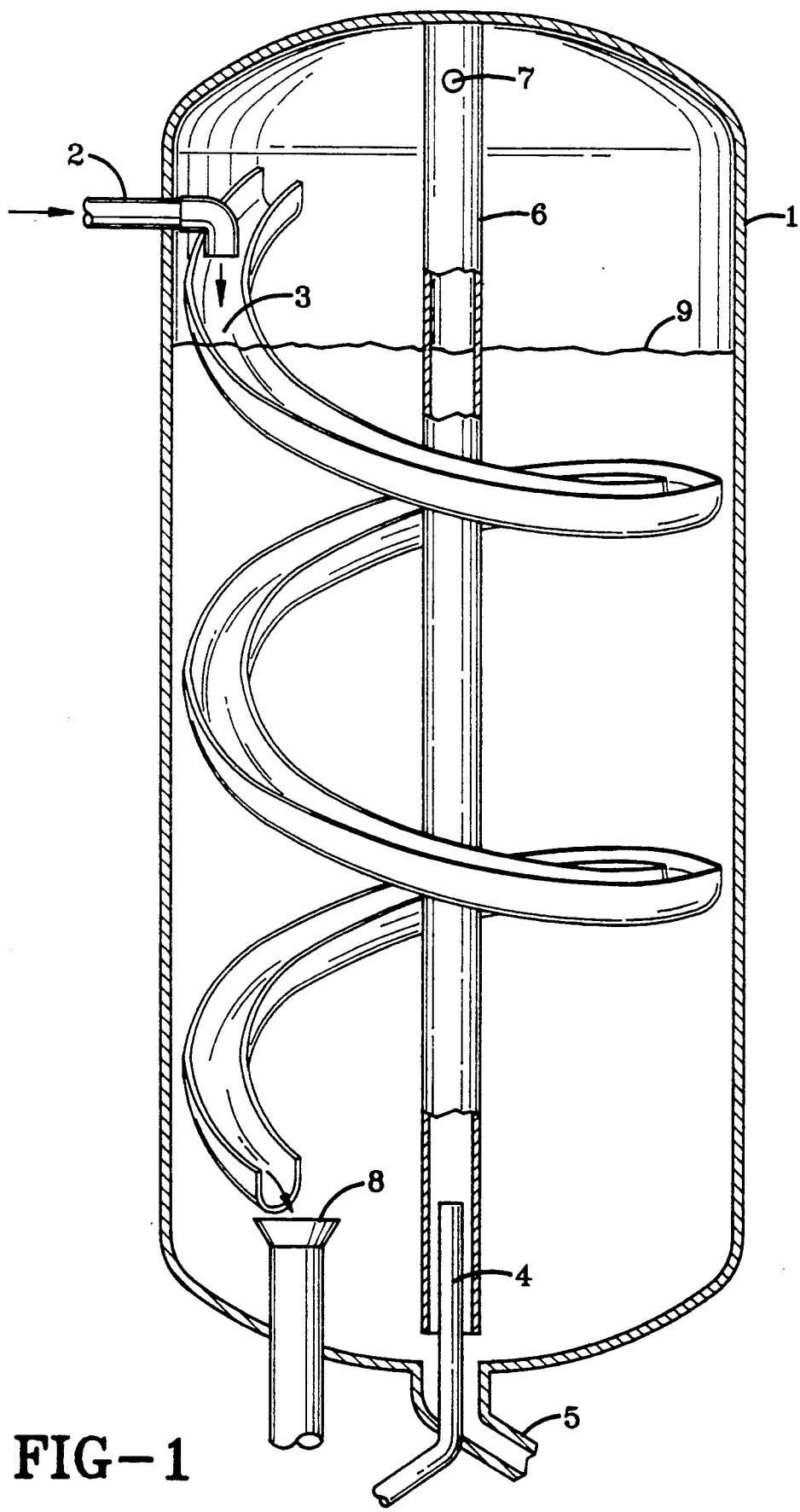
FIG. 1 is a prospective, fragmentary, and diagrammatical view of a separation device which can be utilized in the process of this invention.

The post-consumer PET feed streams purified by the process of this invention contain PET and various foreign material. The foreign materials present in such post-consumer PET feed streams can include glues, elastomers, linear low density polyethylene, high density polyethylene, polypropylene, ethyl vinyl acetates, polyvinyl chloride, residual catalysts, and the like. It is very desirable for as much foreign material to be removed from the PET feed stream as possible by mechanical or other physical means before implementing the process of this invention. In other words, the PET feed stream should be as pure as possible with the technique of this invention being an additional purification step for removing foreign materials in the recycling operation.

The PET in the post-consumer recycle stream is typically comprised of repeat units which are derived from terephthalic acid or a diester thereof and ethylene glycol. However, it is understood that the PET can also be modified with small amounts of other monomers.

Such modified PET can contain small amounts of repeat units which are derived from diacids other than terephthalic acid and/or glycols in addition to ethylene glycol. For instance, small amounts of isophthalic acid or a naphthalene dicarboxylic acid can be used in the diacid component utilized in preparing the PET. PET which has been modified with a small amount of a diol containing from 3 to 8 carbon atoms is also representative of such a modified PET. For instance, a small amount of 1,4-butane diol can be utilized in the glycol component used in preparing the modified PET. Normally, no more than about 5 weight percent of the repeat units in such modified PET will be comprised of diacids or diols other than a terephthalic acid and ethylene glycol. It is, of course, contemplated that diesters of such dicarboxylic acids and diols can also be used. In most cases, such modified PET will contain less than about 3% diacids other than terephthalic acid and less than 3% diols other than ethylene glycol. Such modified polyesters most typically contain only about 1% dicarboxylic acids other than terephthalic acid and/or less than 1% glycols other than ethylene glycol. Polyethylene isophthalate and copolymers thereof will also normally be in the recycle feed stream and are considered to be PET for the purposes of this invention.

The first step in the practice of this invention involves depolymerizing the PET in the post-consumer PET feed stream to a viscosity which is within the range of 0.001 poise to 1,000 poise. In an alternative embodiment of this invention, the post-consumer PET feed stream can be dissolved in a solvent to produce a liquid system. For ease of separation, it is desirable for this viscosity to be as low as possible.

Standard depolymerization techniques can be used in this step. For instance, the procedures described in U.S. Pat. No. 3,703,488 and U.S. Pat. No. 3,884,850, the teachings of which are incorporated herein by reference in their entirety can be used in depolymerizing the PET in the post-consumer PET feed streams. It is generally desirable to depolymerize the PET by adding from about 2 weight percent to about 50 weight percent ethylene glycol to the PET feed stream and heating the PET/ethylene glycol mixture at a temperature within the range of about 180° C. to about 310° C. to cause depolymerization. It is preferred to use a temperature within the range of 220° C. to 270° C. It is generally preferred to use from about 7 weight percent to about 20 weight percent ethylene glycol. Depolymerization procedures which use water, acid or caustic in place of ethylene glycol can also be used. In any case, the depolymerization will be conducted until the viscosity is reduced to within the range of about 0.001 poise to about 1,000 poise. It is preferred for the depolymerization to be carried out to the extent that the viscosity of the liquid has been reduced to within the range of 0.001 poise to 100 poise. It is more preferred for the liquid to have a viscosity which is within the range of 0.1 to 10 poise.

In an alternative embodiment of this invention, the first step can be carried out by dissolving the polyethylene terephthalate feed stream in a sufficient amount of an organic solvent to produce a liquid system having a viscosity which is within the range of 0.001 poise to 1,000 poise. A wide variety of solvents or solvent systems capable of dissolving the PET at room temperature or at a slightly elevated temperature can be employed. However, it is important to select a solvent which is not capable of dissolving the foreign materials in the feed stream. It is preferred for the solvent used to have a low boiling point so that residual solvent can be more easily removed from the PET which is recovered. Some representative examples of suitable solvents include nitro-benzene, acetonapthone, hexafluoroacetone, hexafluoroisopropanol, meta-cresol, trifluoroacetic acid/methylene chloride mixed solvent systems, nitro. benzene/tetrachloroethane mixed solvent systems, hexafluoroisopropanol/chloroform mixed solvent systems, and tetrachloroethane/phenol mixed solvent systems. Trifluoroacetic acid/methylene chloride mixed solvent systems which contain from about 25 weight percent to about 75 weight percent trifluoroacetic acid and from about 25 weight percent to about 75 weight percent methylene chloride are preferred. It is generally more preferred for such solvent systems to contain from about 40 to about 60 weight percent tetrafluoroacetic acid and from about 40 to about 60 weight percent methylene chloride.

The liquid, which is generally a melt, produced in the first step is then fed into a separation device. This separation device as depicted in FIG. 1 acts as a float cell which separates low density foreign materials and high density foreign materials from the PET oligomer produced by the depolymerization step. This invention is based upon the unexpected discovery that most common polymers which are found in the PET feed stream as contaminants are immiscible with the liquid depolymerized PET and will float upon its surface. This causes the low density foreign materials to migrate to the surface of the melt by flotation. Techniques which rely on migration by centrifugal force or centripetal force can also be used. Heavy foreign materials, such as stones, glass, fibers, and metals, will sink to the bottom of the liquid depolymerized PET.

A separation device which is designed for use in practicing the subject invention is shown in FIG. 1. This separation device is essentially a closed vessel 1. The depolymerized PET made in the depolymerization step is fed into the separation device through inlet pipe 2. The melt discharged through the inlet pipe 2 flows down trough 3 to the surface of the melt 9 in the separation device. The trough 3 allows the melt from the depolymerization step to be gently discharged onto the surface of the melt 9 regardless of the level of the melt in the separation device. This prevents low density foreign materials from plunging deep into the melt. Accordingly, the low density foreign materials simply remain on the surface of the melt without needing to float to the surface of the melt 9 from areas far below the surface of the melt 9. In the separation device shown in FIG. 1, the trough 3 simply spirals around the inside wall of the closed vessel 1. However, it is contemplated that other trough designs which will accomplish the same purpose can be utilized. Nevertheless, there is some benefit to the spiral design which causes some degree of spinning action and some centrifugal force which facilitates the separating action.

The depolymerized PET in the liquid is removed from an area which is located intermediately between the surface of the melt 9 and the bottom of the liquid (the bottom of the closed vessel). Of course, the low density foreign materials accumulate on the surface of the liquid with the high density foreign materials sinking to the bottom of the liquid. Thus, the portion of the melt which is located intermediately between the surface of the liquid and the bottom of the liquid contains mostly depolymerized PET of reasonably high purity.

The depolymerized PET is removed from this area located intermediately between the surface of the liquid and the bottom of the liquid through depolymerized PET discharge pipe 4. It is preferred for the inlet 10 to PET oligomer discharge pipe 4 to be surrounded by a stand pipe 6 which prevents low density foreign materials and high density foreign materials from being sucked directly into the PET oligomer discharge pipe 4. The inner diameter of shield pipe 6 is sufficiently greater than the outside diameter of depolymerized PET discharge pipe 4 to allow for the smooth flow of depolymerized PET between the two pipes allowing for the depolymerized PET to be withdrawn through the inlet 10 to the depolymerized PET discharge pipe 4. Stand pipe 6 which operates with discharge pipe 4 as underflow and overflow weirs preventing low density material and/or high density material from being sucked into discharge pipe 4. The stand pipe 6 will include at least one hole 7 in it at a level which is above the maximum operating surface of the liquid. Such a hole 7 allows the pressure, both inside the stand pipe 6 and outside of the stand pipe but within the closed vessel 1, to be at equilibrium.

High density foreign materials which sink to the bottom of the liquid in the closed vessel can be continuously or periodically removed through high density foreign material discharge pipe 5. Heavy contaminants such as stones, glass, and metals which travel down the entire length of the trough 3 can be collected and removed from the separation device through heavy contaminant discharge pipe 8. In operating the separation device, it will be necessary to remove the low density foreign material floating on the surface of the liquid from time to time or continuously. This can be accomplished by discharging the entire contents of the closed vessel through the high density foreign material discharge pipe 5. In doing so, all of the low density foreign material floating on the surface of the liquid can be removed. The frequency at which such a discharge step is needed will depend upon the purity of the post-consumer PET feed stream and the corresponding amount of low density foreign materials therein.

This invention is further illustrated by the following examples which are merely for the purpose of illustration and are not intended to limit the scope of the invention or the manner in which it can be practiced. Unless otherwise indicated herein all parts and percentages are given by weight.

EXAMPLE 1

In this experiment, the process of this invention was utilized to show that melt blended linear low density polyethylene could be removed from PET. This procedure was carried out utilizing laboratory equipment. In the procedure used, 500 grams of depolymerized PET from clear post consumer bottles was melted in a flask at a temperature of about 220° C. The depolymerized PET had an average chain link of four repeat units. After the depolymerized PET had completely melted, the temperature was increased to about 255° C. Then, 100 grams of sheet which was comprised of a melt blend containing about 97% PET and about 3% linear low density polyethylene (by weight) was added to the flask in small strips over a period of about 20 minutes. The polyethylene in the sheet was dispersed to a particle size of less than 1 micron. The polyethylene rose to the surface of the melt and was pushed to the center due to the centrifugal action caused by the stirrer. This is due to the fact that the polyethylene is lighter than the PET melt. The specific gravity of the linear low density polyethylene was about 0.97 and the specific gravity of the PET melt was about 1.22. After about 3 grams of the sheet had melted, a small amount of polyethylene rose to the surface and began to agglomerate and began to cling to a stirring rod in the flask at which point about 3 ml of ethylene glycol was added. The melt was maintained at a temperature of about 255° C. for about 20 minutes to ensure that all of the PET from the sheet was depolymerized and to allow sufficient time for all of the polyethylene to rise to the surface. It was observed that the polyethylene particles agglomerated together as they rose to the surface forming large clumps which were thrown to the center of the flask due to the centripetal action. The polyethylene accordingly agglomerated around the stirrer located in the center of the flask. The polyethylene which had agglomerated was removed from the melt by simply pulling the stirrer from the flask. This was possible because the polyethylene adhered together as a solid mass on the surface of the stirrer.

After the polyethylene was removed from the stirrer, the stirrer was, again, inserted into the flask. After stirring had been resumed, a second batch of sheet was added to the flask with about 5 ml of ethylene glycol. The separation continued as before. Again, the polyethylene agglomerated and was collected from the stirrer. The stirrer was, again, cleaned and replaced in the flask. After stirring was resumed, a third hundred gram batch of sheet was added to the flask with an additional 5 ml of ethylene glycol.

The total quantity of polyethylene collected in this experiment was 9 grams. This represents a polyethylene removal efficiency of 100%. This experiment demonstrates the operability of the subject invention and shows that it is 100% efficient.

EXAMPLE 2

This experiment shows that the technique of this invention can be utilized in large scale operations. In the procedure used, 1,644 lbs. (746 kg) of depolymerized PET containing 0.36 weight percent polyethylene was fed into a separation device having the design shown in FIG. 1. The separation device was maintained at a temperature above the melting point of the depolymerized PET. The polyethylene floated to the surface of the melt and agglomerated into a solid mass. The purified stream of depolymerized PET was recovered from the separation device and was determined by DSC (differential scanning calorimetry) to be free of polyethylene. In fact, the depolymerized PET feed stream was used in the synthesis of PET bottle resin. Bottles were made from such resin with no evidence of polyethylene contamination being observed. This illustrates the efficiency of the separation device and the process of the subject invention.

Variations in the present invention are possible in light of the descriptions of it provided herein. It is, therefore, to be understood that changes can be made in the particular embodiments described which will be within the full intended scope of the invention as defined by the following appended claims.

What is claimed is:

1. A process for removing foreign materials from a polyethylene terephthalate feed stream which comprises: (1) depolymerizing the polyethylene terephthalate feed stream into a liquid melt having a viscosity which is within the range of 0.001 poise to 1000 poise, (2) feeding the liquid melt into a separation device, (3) allowing low density foreign materials to migrate to the surface of the liquid melt, (4) allowing high density foreign materials to migrate to the bottom of the liquid melt, and (5) removing depolymerized polyethylene terephthalate from an area which is located intermediately between the surface of the liquid melt and the bottom of the liquid melt.

2. A process as specified in claim 1 wherein the liquid melt has a viscosity which is within the range of 0.01 poise to 100 poise.

3. A process as specified in claim 1 wherein the liquid melt has a viscosity which is within the range of 0.1 poise to 10 poise.

4. A process for removing foreign materials from a polyethylene terephthalate feed stream which comprises: (1) depolymerizing the polyethylene terephthalate feed stream into a liquid melt having a viscosity which is within the range of 0.001 poise to 1000 poise, (2) feeding the liquid melt into a separation device, (3) allowing low density foreign materials to migrate to the surface of the liquid melt, and (4) removing depolymerized polyethylene terephthalate from below the surface of the liquid melt.

5. A process as specified in claim 4 wherein the separation device is enhanced by centrifugal action.

6. A process as specified in claim 1 wherein the low density foreign materials migrate to the surface of the liquid by flotation and wherein the high density foreign materials migrate to the bottom of the liquid by sinking.

7. A process as specified in claim 1 wherein the depolymerized polyethylene terephthalate is polyethylene terephthalate oligomer.

8. A process as specified in claim 1 wherein the melt is at a temperature which is within the range of about 180° C. to about 310° C.

* * * * *